(12) United States Patent
Strader et al.

(10) Patent No.: US 7,796,625 B2
(45) Date of Patent: Sep. 14, 2010

(54) RECOVERY FLUSHING FOR A NETWORK PACKET DISPATCHER

(75) Inventors: Todd Alan Strader, Hopewell Junction, NY (US); Scot H. Rider, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 11/621,604

(22) Filed: Jan. 10, 2007

(65) Prior Publication Data

US 2008/0165792 A1 Jul. 10, 2008

(51) Int. Cl.
*H04L 12/56* (2006.01)

(52) U.S. Cl. .................. 370/412; 370/217; 370/218

(58) Field of Classification Search .................. None
See application file for complete search history.

(56) References Cited

U.S. PATENT DOCUMENTS

| | | | |
|---|---|---|---|
| 4,607,363 A | | 8/1986 | Platel et al. |
| 4,817,084 A | | 3/1989 | Arthurs et al. |
| 5,086,428 A | * | 2/1992 | Perlman et al. ............ 370/394 |
| 5,777,987 A | | 7/1998 | Adams et al. |
| 6,061,399 A | * | 5/2000 | Lyons et al. ............... 375/240 |
| 6,556,578 B1 | * | 4/2003 | Silberschatz et al. ........ 370/412 |
| 6,963,572 B1 | | 11/2005 | Carr et al. |
| 7,075,928 B1 | * | 7/2006 | Branth et al. ............... 370/390 |
| 7,224,693 B1 | * | 5/2007 | Zhou et al. ............... 370/395.1 |
| 2002/0136211 A1 | * | 9/2002 | Battle et al. ................. 370/389 |
| 2003/0028580 A1 | * | 2/2003 | Kucherawy ................. 709/101 |
| 2004/0109412 A1 | * | 6/2004 | Hansson et al. ............. 370/229 |
| 2004/0221089 A1 | * | 11/2004 | Sato et al. ................... 711/100 |
| 2007/0104211 A1 | * | 5/2007 | Opsasnick ................. 370/412 |
| 2008/0117913 A1 | * | 5/2008 | Tatar et al. ................. 370/392 |
| 2008/0291882 A1 | * | 11/2008 | Martinotti et al. ........... 370/338 |

* cited by examiner

*Primary Examiner*—Jayanti K Patel
*Assistant Examiner*—Anthony Sol
(74) *Attorney, Agent, or Firm*—Scully, Scott, Murphy & Presser, P.C.; John E. Campbell, Esq.

(57) ABSTRACT

A system and method for purging data packets in a network is provided. The method in one aspect includes monitoring an outbound queue for one or more selected packets to be pulled from the outbound queue. The method may further include waiting for a predetermined amount of time for the selected packets to enter a retry queue and monitoring the retry queue for the selected packets to be pulled from the retry queue. The method may also include determining if the selected packets pulled from the retry queue meet one or more specified criteria and purging the selected packets if the specified criteria is met. The method may further include returning to the step of monitoring an outbound queue if another purge signal is received.

17 Claims, 4 Drawing Sheets

RECOVERY FLUSHING FOR A NETWORK PACKET DISPATCHER

FIELD OF THE INVENTION

The present disclosure generally relates to computer systems and more specifically to purging data packets, for example, in network packet dispatcher systems.

BACKGROUND OF THE INVENTION

In a system with multiple network packet dispatchers, multiple transmit ports and multiple endpoints or nodes, it may be desirable to purge the system of all packets going to a specific port or node, for instance, in the event of an error or fencing condition. In this kind of system there would need to be FIFOs (first-in-first-out) per dispatcher per port to handle the traffic from the different dispatchers. One solution is to completely halt the input of packets into the system and then let the entire system drain. Such implementation, however, could take time and also cause delays and unnecessary interruptions to streams of traffic that are not being purged.

U.S. Patent Application Publication No. 20020136211 uses a shared memory structure to manage flow control of packets and the purging of such packets. However, the method described in that publication does not determine packets that possess a particular attribute for purging from a pipeline and FIFO.

U.S. Patent Application Publication No. 20040109412 discusses a system for switching packet data flow including the buffering of packets from paths in a queue and purging state information from a FIFO structure. The system described in that publication, however, purges only one item. It does not search the entire structure to purge multiple items.

U.S. Pat. No. 4,607,363 describes a mechanism for preventing a buffer from filling up. The oldest packets are purged from the system when a threshold is reached. That mechanism, however, does not compare multiple attributes or multiple values for multiple attributes, rather only time data in the buffer. It also does not purge all packets of a certain attribute, but keeps the buffer contents down.

U.S. Pat. No. 4,817,084 discusses purging packets on a per port basis for resolving packet switch conflicts. However, there is no mechanism for clearing a buffer or pipeline of said packets. Rather, packets are dropped at the source such as the microprocessor. U.S. Pat. No. 5,086,428 describes a purging packet, which directs a node or endpoint to remove all information about a given node in a database stored on a particular node. U.S. Pat. No. 5,777,987 describes purging due to acknowledgment and U.S. Pat. No. 6,963,572 describes a mechanism for purging one particular corrupted packet on a remote node. Those patents, however, do not provide purging outstanding packets from a buffer and pipeline, which have a particular attribute.

Accordingly, an improved method for purging outstanding packets from one or more pipelines or FIFOs is desirable. Preferably, the purging mechanism allows purging of packets having one or more specified attributes or values of attributes. Further, it is desirable to have a purging mechanism that can purge packets with a specific attribute without interrupting the flow of other packets.

SUMMARY OF THE INVENTION

A method and system for purging data packets is provided. The method is one aspect may include receiving an external signal to purge one or more packet destined for a selected node, traversing a series of states for controlling purging of the one or more packet destined for a selected node, receiving a second external signal to purge second one or more packets destined for a second selected node, and returning control to a purging state from one of the series of states, for example, any one of the series of states, in response to receiving the second external signal, wherein the purging of the one or more packets destined for a selected node is combined with purging of the second one or more packets destined for a second selected node.

In another aspect, the method may include monitoring an outbound queue for one or more selected packets to be pulled from the outbound queue. The method may further include waiting for a predetermined amount of time for the selected packets to enter a retry queue and monitoring the retry queue for the selected packets to be pulled from the retry queue. The method may also include determining if the selected packets pulled from the retry queue meet one or more specified criteria and purging the selected packets if the specified criteria is met. The method may further include returning to the step of monitoring an outbound queue if another purge signal is received.

A system for purging data packets in one aspect may include a finite state machine including at least a plurality of states and a plurality of set-reset latches operable to be set in response to an external purge signal. The finite state machine in response to one or more of the plurality of the set-reset latches being set, may be operable to move into a first state for monitoring pulling one or more packets from an outbound queue. The finite state machine may be further operable to move into a wait state for waiting a predetermined time for one or more packets to enter a retry queue. The finite state machine may also be operable to move into a second state for monitoring of pulling one or more packets from the retry queue and for allowing purging of one or more packets pulled that have one or more specified criteria. The finite state machine may be further operable to move into a flushed state when the one or more packets are pulled from the retry queue and selected packets are purged. The finite state machine may be further operable to return to the first state from another state when one or more of the plurality of set-reset latch is set.

In another aspect, a system for purging data packets may include at least a finite state machine including at least a plurality of states and a set-reset latch having at least one bit memory operable to be set in response to an external purge signal and reset in response to the finite state machine being in an idle state. The finite state machine in response to the set-reset latch being set, may be operable to move into a drain outbound FIFOs state, the finite state machine being in the drain outbound FIFOs state while all or selected packets are pulled from an outbound FIFO. The finite state machine may also be operable to move into a wait state for a predetermined time the all or selected packets are pulled from the outbound FIFO. The finite state may further be operable to move into a drain requeue FIFOs state after the predetermined time, the finite state machine being in the drain requeue FIFOs state while one or more selected packets are pulled from a requeue FIFO. The finite state machine may also be operable to move into a flushed state after one or more selected packets are pulled from a requeue FIFO and one or more packets pulled that have one or more specified criteria are purged. The finite state machine may be further operable to return to the drain outbound FIFO state whenever a restart signal is asserted to the set-reset latch.

Further features as well as the structure and operation of various embodiments are described in detail below with ref-

DETAILED DESCRIPTION OF THE PREFERRED EMBODIMENTS

Figure 1:
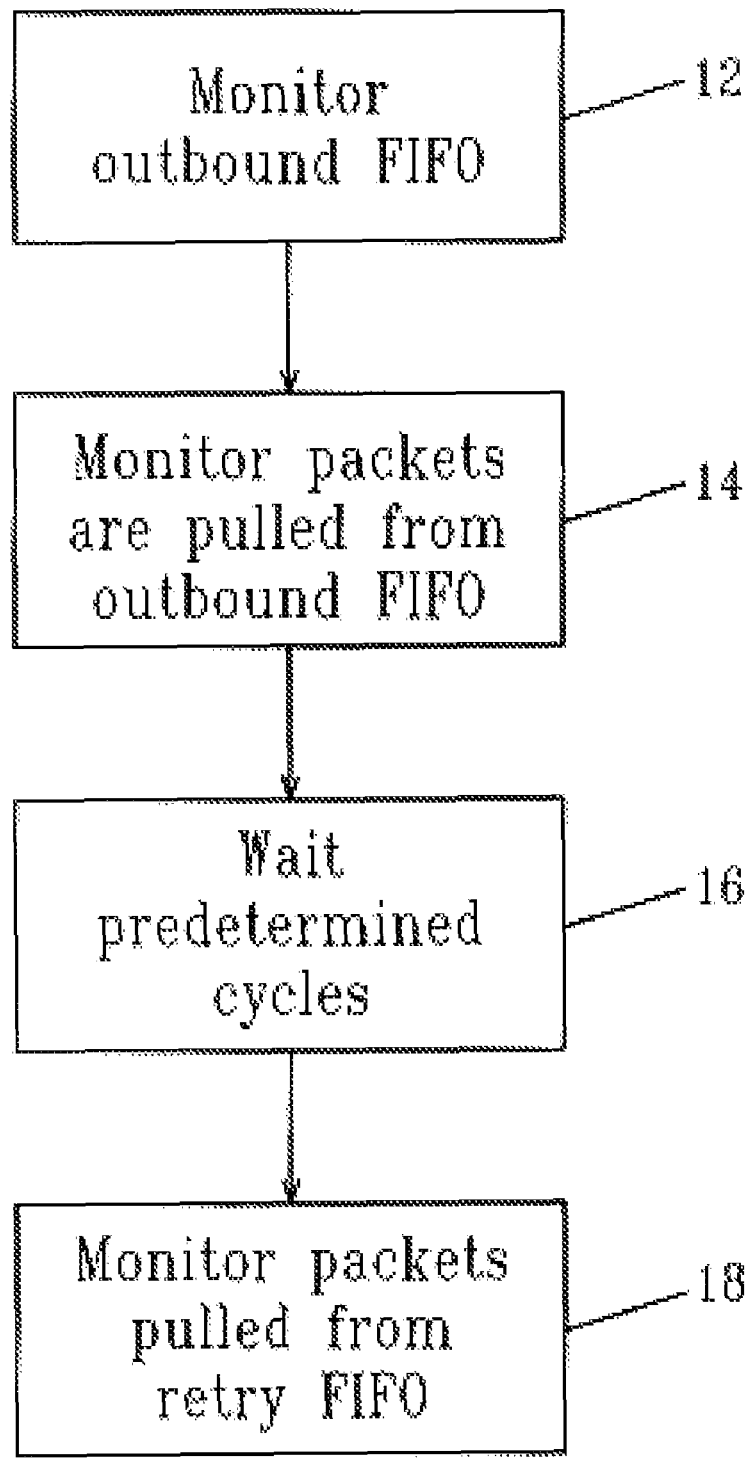
FIG. 1 is flow diagram illustrating a method for purging packets in one embodiment of the present invention.

FIG. 1 is a flow diagram illustrating a method for purging packets, for example, for a given port or node of a network system in one embodiment of the present invention. Purging, for example, may be performed in response to an error condition, although not limited to such. As another example, purging may be initiated from some form of software, which may write to a register in a chip, which in turn starts the purging process. In yet another example, purging may be directed from an automatic hardware response. For instance, an error happens on port X and the chip may be programmed to automatically take down a port and purge all its packets. In one embodiment, hardware or software or any other entity or object may direct the purging process and may also specify one or more attributes for purging such as ports and nodes that are associated with the packets.

For port purging, that is, purging one or more packets associated with a particular port, once the purging begins the method in one embodiment at step 12 watches or monitors the outbound FIFOs, for example, connected to a Transmit port, for that port. At step 14, the method checks to make sure that all packets that were in the FIFOs at the original moment in time have been pulled, that is, passed onto another stage in the pipeline. For instance, a dispatcher in the course of routing the received packets to a network pulls packets from the queue for dispatching or appropriate processing. The method at step 16 waits the appropriate number of cycles for a packet to reenter the dispatcher through the sent port. For example, a packet may reenter the dispatcher to be held in the retry FIFO in case retransmission is needed. A retry FIFO, for example, may hold packets that are potentially retried and may hold packets of multiple ports. The appropriate number of cycles in one embodiment may be based on a number of cycles it takes for packet to travel from the outbound FIFO back into the dispatcher, and may be a static number.

At step 18, the method in one embodiment ensures that all packets in the retry FIFOs from before the time the method reached this stage, for instance, the current finite state machine state, have been pulled. When they are pulled from the retry FIFO, they may be transmitted, purged, or held longer. The pulled packets with attributes that match for purging are then purged. Consider an example in which packets destined for node 5 are candidates for purging and the retry FIFO contains packets destined for nodes 3, 4, 5, 2, 5, 3 and 5. In one embodiment of the present disclosure, as these packets are pulled for processing, their attributes are evaluated to determine which packets are destined for node 5. Those that have the matching attributes, for example, packets having attributes destined for node 5, are purged. This mechanism in one embodiment purges the desired packets while allowing normal dispatcher functions to progress. In one embodiment, when a packet is deemed to be purged, one or more buffers associated with that packet are placed back into a free buffer list so that the buffers may be reused. Such a packet is now purged.

In the case of a node purge, that is, purging all packets destined to a particular node, the same mechanism may be used in one embodiment. Since there may be packets destined to a particular node in more that one outbound FIFO, all outbound FIFOs are monitored. If another node purge arrives while it is servicing one, the node purge is restarted in one embodiment. In one embodiment, all node purges are extended until all have finished. For example, rather than keeping track of a purge for node X, Y and Z separately, they are all aggregated. If a node purge is commanded for node X, the purge starts. If nothing else happens, the purge for node X will finish and then there will be no more packets destined for node X in the system. However, if a node purge for node Y arrives while the node purge for node X is still proceeding, the two node purges are combined. Effectively, node X's node purge starts over. Or, node X's and node Y's purges combine. This may extend the time it would take for node X's node purge to finish, but saves considerable logic as the number of nodes in a system grows.

The method and system of the present disclosure in one embodiment allows purging of selected packets while all other streams of traffic such as packets to other nodes and ports proceed without being interrupted. For example, in the case of a port, packets to other ports are not disrupted. Similarly, during a node purge, packets to other nodes are not disrupted. Further, in the case of the node purge in one embodiment, only one mechanism is needed for all nodes in the system. Typically, purging is an exception. That is, in typical systems, it is expected that a network will spend most of its time sending packets and not throwing them away. Since purging is an exception, it may not be necessary to create additional logic and use more space on a chip in order to increase the speed at which purging is performed. Rather, so long as the performance decrease is reasonable, a savings in space is more desirable.

Figure 2:
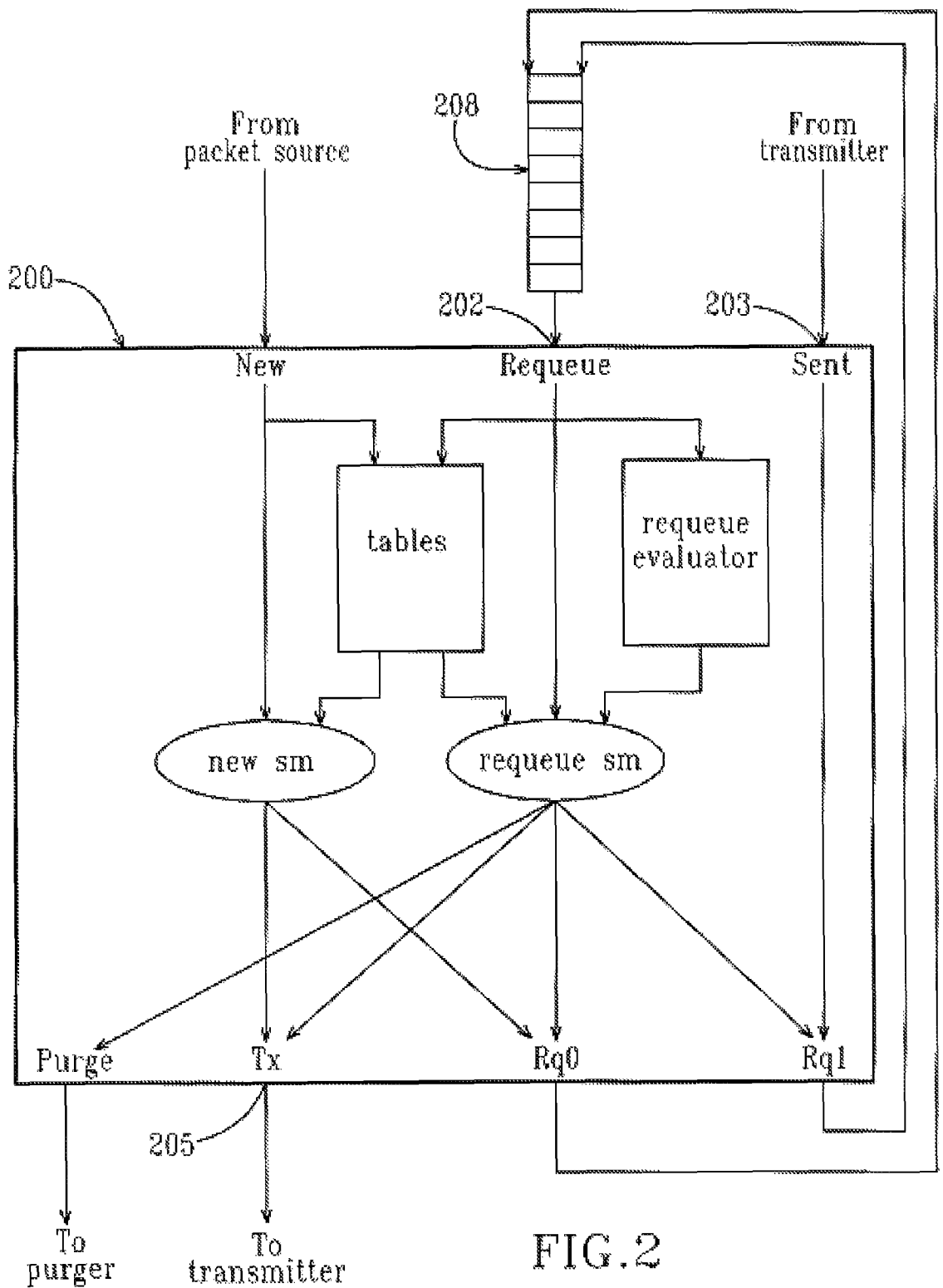
FIG. 2 is a block diagram illustrating a network packet dispatcher in one embodiment of the present invention.

FIG. 2 is a block diagram illustrating a network packet dispatcher in a network topology in one embodiment. The method and system of the disclosure may be used to purge data packets in such network packet dispatchers in one embodiment. The network packet dispatcher, for example, may be a part of a node in a network. In one embodiment of the present invention, FIFO queues storing network packets may be purged in response to an error condition, software command, hardware command, etc., but not limited to such. A dispatcher 200, for example, may include an outbound FIFO connected to a transmit port 205, a retry FIFO 208 for storing packets that are candidates for retransmission, and sent port 203 via which packets may reenter the dispatcher 200. In one embodiment of the present disclosure, packets may be deleted according to one or more predetermined criteria, such as those packets associated with a specific port or those associated with a node. For purging packets destined for a node, packets involved may be queued in one or more FIFOs such as outbound FIFO and retry FIFO. For example, packets in FIFO 208 associated with requeue port 202, packets in outbound FIFO associated with a particular port or node may be purged.

Figure 3:
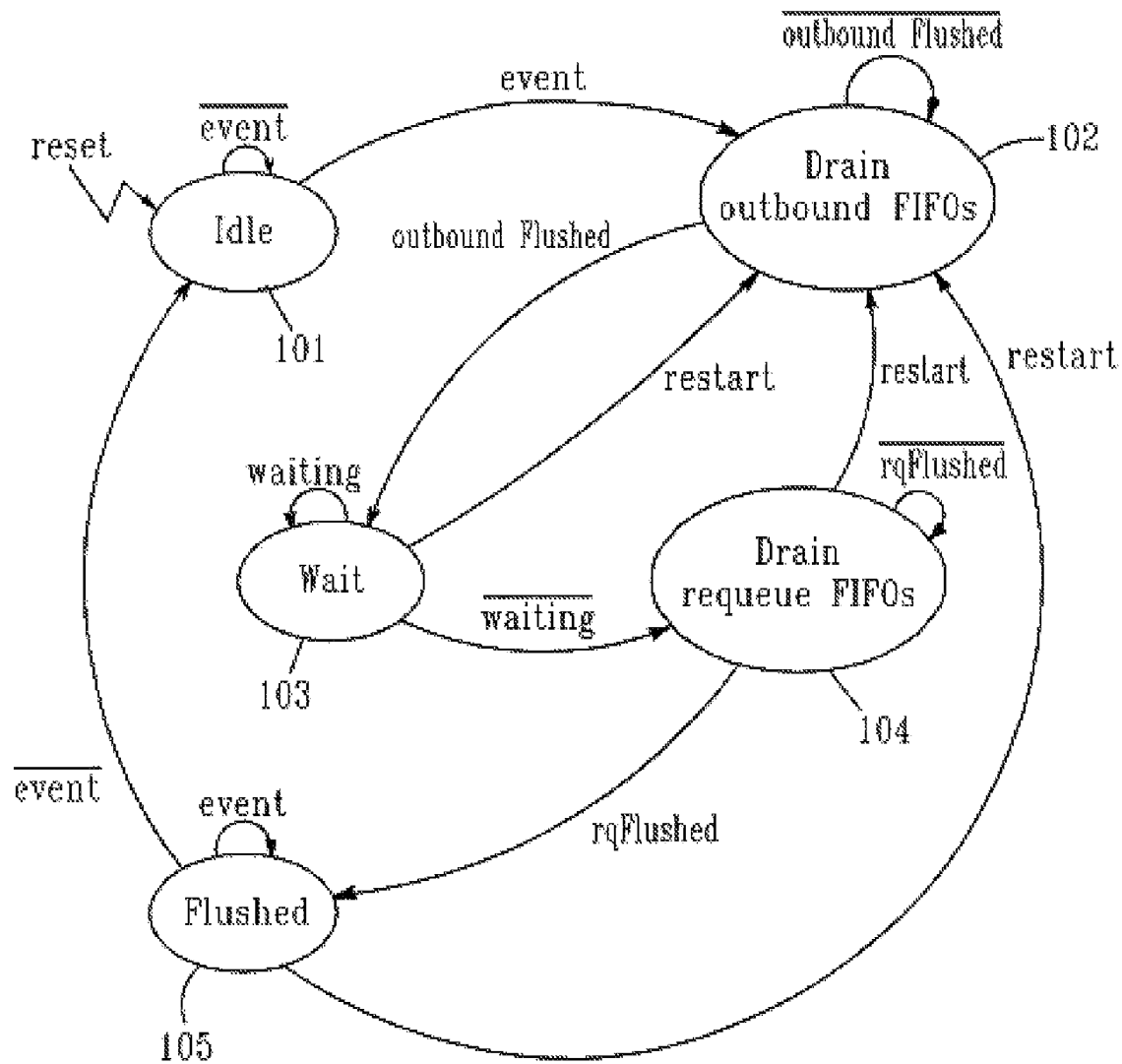
FIG. 3 is a state diagram illustrating purging states in one embodiment of the present invention.

FIG. 3 shows a finite state machine (FSM) in one embodiment that controls the flushing mechanism. The states and transitions are described below.

Idle (101)—The FSM is started here and remains in this state until a purge event occurs. Once an event happens the FSM is sent to the drain outbound FIFOs state.

Drain outbound FIFOs (102)—For a port purge, that is, purging packets associated with a particular port, the method in one embodiment waits in this state until all the outbound FIFOs pertaining to the specific port are empty. For node purging, that is, purging packets destined for a selected node, snapshot is taken of all the write (or tail) pointers into the FIFOs. A snapshot, for example, represents a record of where a pointer is at the point, which the snapshot was taken. In one embodiment, when each read (or head) pointer has passed the snapshot point the draining has been accomplished. Briefly, a FIFO is generally implemented in hardware as a chunk of memory (SRAM or array of latches). A tail pointer indicates the next position in memory to be written and a head pointer indicates the next position in memory to be read. When data is pushed (written) to the FIFO, the tail pointer is used and then incremented. Similarly, when data is pulled (read) the head pointer is used and then incremented. In order to make sure all entries from time X and on have been pulled from the FIFO, a record or a snapshot of the tail pointer is taken at time X. Once the head pointer passes that recorded position, all the entries in the FIFO before time X have been pulled. The method in one embodiment does not wait for the FIFO's to empty in the case of node purging since other nodes may be using these FIFOs and therefore they may never empty. For example, packets that are destined for other nodes may be queued in the FIFOs. That is, multiple nodes may be reached from one port. Once the condition has been met for the specific type of purging then the FSM moves to the wait state.

Wait (103)—This state allows for enough time to pass so that packets can move from the transmission mechanism back into the requeue FIFO. Generally, the transmission mechanism refers to how a packet is put out on a port and subsequently into the rest of the network. The requeue (or retry) FIFO stores data in case it needs to be resent. When the FSM arrives at this state, a countdown timer is started. When the timer has expired the FSM moves to the drain requeue FIFOs state. If at any point while in this state the restart signal is asserted then the FSM moves back to the drain outbound FIFOs state.

Drain requeue FIFO (104)—A snapshot is taken of all the write pointers for all the requeue FIFOs when this state is reached similarly to the node purge case for the drain outbound FIFOs state. Once all head pointers pass their respective write pointer snapshots than the FSM is moved to the flushed state. If a particular packet cannot be purged which pertains to the current port or node purge condition then new snapshots of the requeue FIFO write pointers are taken, effectively restarting just this state. If at any point while in this state the restart signal is asserted then the FSM moves back to the drain outbound FIFOs state.

Flushed (105)—If the external purge is still active the FSM waits in this state until the signal drops, at which event the FSM returns to the idle state. External purge refers to an external stimulus that started the purge. In one embodiment, it is a single bit signal per purge event. External purge signal mechanism may be managed in a plurality of ways. For one, firmware may hold the external purge signal and poll the state machine until it hits the flushed state. This indicates that the purging has been completed. The firmware then may drop the external purge signal and continue with the knowledge that the purge has been completed. In another aspect, the external purge signal may be implemented as a pulse. This embodiment may be useful if firmware does not need a feedback as to whether the purge completed or is not involved in purging, for example, because it is some automatic hardware initiated purge. If at any point while in this state the restart signal is asserted then the FSM moves back to the drain outbound FIFOs state.

In one embodiment, the restart signal is only used for node purging. If another external node purge is signaled while the FSM is not in the idle state then restart signal is asserted. In this way, there is no need to keep state information per node. Rather, there is only one state machine per node. All of the node purges are effectively combined. This may artificially extend a particular node's purge, but it significantly decreases the amount of logic that is needed. This extends the node purging for all the nodes so that only one FSM needs be used for all nodes.

Figure 4:
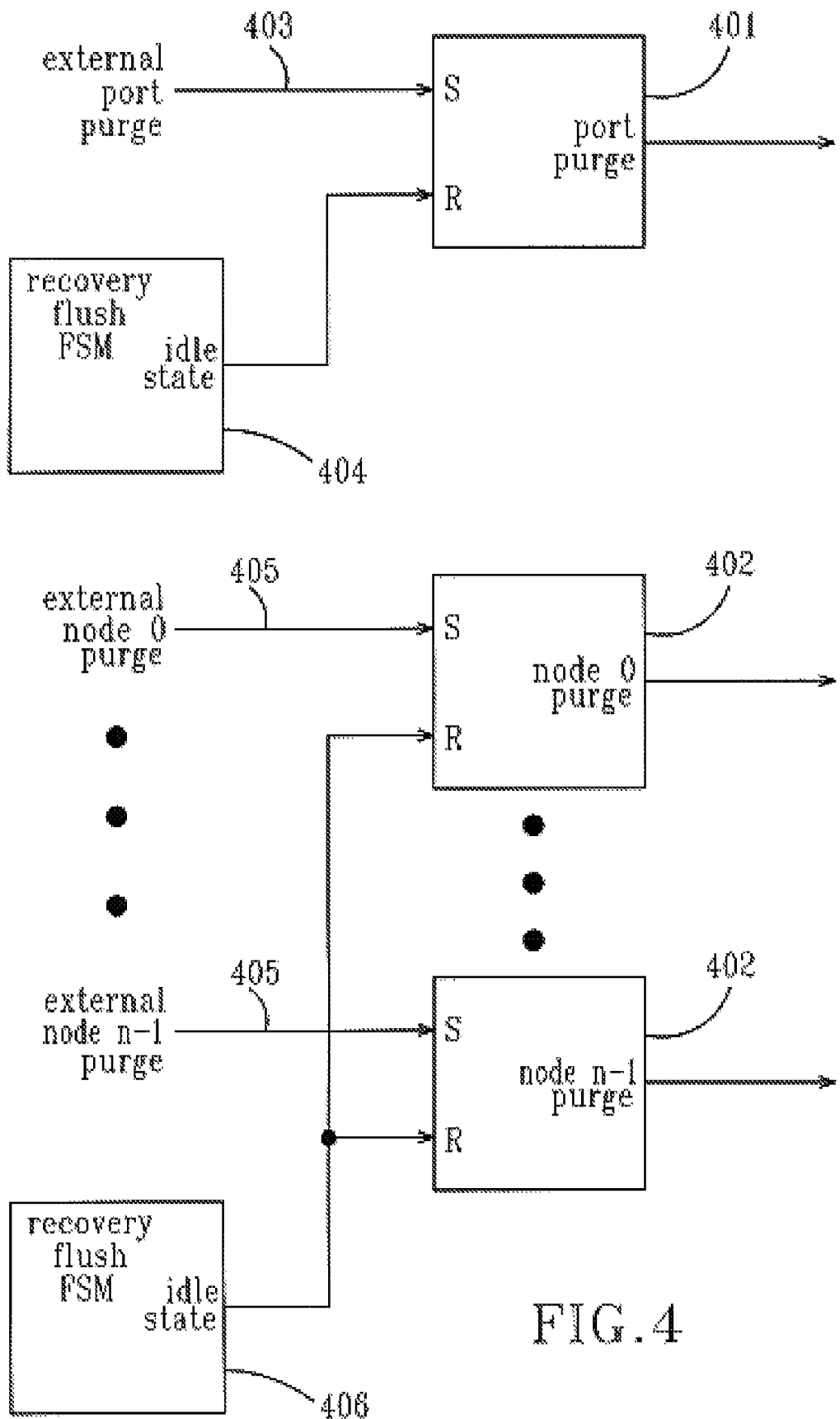
FIG. 4 is a block diagram illustrating a purge control logic and accompanying state machines in one embodiment of the present invention.

FIG. 4 is a block diagram of the purge control logic and accompanying state machines. The method and system of the present disclosure in one embodiment ensures the removal of all desired packets by extending the purge signal while it is not in the idle state. For port purging a single set-reset latch 401 is used which is set by the external purge signal 403 and is reset by the FSM 404 being in the idle state in one embodiment. For node purging a vector of set-reset latches 402 is used in which every latch is set by its individual node purge 405 in one embodiment and they are all reset by the FSM 406 being in the idle state. While FIG. 4 illustrates a latch as an example device used in the purge control logic, any other device may be used to perform the similar function. In one embodiment, a node purge state machine continues to reset itself every time a new node purge request is received.

In one embodiment of the present disclosure, each port purge may include a separate FSM. For all node purges, one FSM is provided in one embodiment of the present disclosure. This purge extending mechanism is shown below with reference to FIG. 4. A set-reset latch (both 401 and 402) is one bit of memory which goes to 1 when the set(S) signal goes to 1 and also goes to 0 when the reset(R) signal goes to 0. In one embodiment, these are set-dominant latches, in other words, if both set and reset are on (1) then the latch goes to 1(set). 401 is a port purge condition for a particular port. 402 are each of the node purge conditions for all the nodes. When an external purge occurs (403, 405), it sets the appropriate latch (401, 402), and when the state machine (404, 406) finally goes back to the idle state, the latch (401, 402) is reset.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of purging data packets in a network, comprising:

monitoring an outbound queue for one or more selected packets to be pulled from the outbound queue;

waiting for a predetermined amount of time for the selected packets to enter a retry queue;

monitoring the retry queue for the selected packets to be pulled from the retry queue;

determining if the selected packets to be pulled from the retry queue meet one or more specified criteria;

purging the selected packets if the specified criteria is met; and returning to the step of monitoring an outbound queue if another purge signal is received, wherein the step of monitoring an outbound queue includes:

recording a location pointed to by a write pointer in the outbound queue at a given time; and monitoring to determine whether a read pointer in the outbound queue has passed the recorded location.

2. The method of claim 1, wherein the step of returning includes:
returning to the step of monitoring an outbound queue from any one of the steps if another purge signal is received.

3. The method of claim 1, further including:
establishing a finite state machine for controlling the steps.

4. The method of claim 3, wherein the step of monitoring an outbound queue is performed while the finite state machine is in a first state, the step of waiting is performed while the finite state machine is in a wait state, and the steps of monitoring the retry queue, determining and purging are performed while the finite state machine is in a second state.

5. The method of claim 3, further including:
detecting whether a signal for purging is inactive; and
allowing the finite state machine to return to an idle state if the signal for purging is inactive.

6. The method of claim 1, wherein the one or more specified criteria include port identification or node identification or combination thereof.

7. The method of claim 1, wherein the step of waiting is performed when all packets in the outbound queue have been pulled.

8. The method of claim 1, wherein the steps of determining and purging are performed during the step of monitoring the retry queue.

9. A method of purging data packets in a network comprising:
monitoring an outbound queue for one or more selected packets to be pulled from the outbound queue;
waiting for a predetermined amount of time for the selected packets to enter a retry queue;
monitoring the retry queue for the selected packets to be pulled from the retry queue;
determining if the selected packets pulled from the retry queue meet one or more specified criteria;
purging the selected packets if the specified criteria is met; and
returning to the step of monitoring an outbound queue if another purge signal is received, wherein the step of waiting is performed when a read pointer in the outbound queue has passed a write pointer location recorded at a given time.

10. A system for purging data packets in a network, comprising:
a finite state machine including at least a plurality of states;
a plurality of set-reset latches operable to be set in response to an external purge signal,
the finite state machine in response to one or more of the plurality of the set-reset latches being set, operable to move into a first state for monitoring pulling one or more packets from an outbound queue, the finite state machine further operable to move into a wait state for waiting a predetermined time for the one or more packets to enter a retry queue, the finite state machine further operable to move into a second state for monitoring of pulling the one or more packets from the retry queue and for allowing purging of one or more packets pulled that have one or more specified criteria, the finite state machine further operable to move into a flushed state when the one or more packets are pulled from the retry queue and selected packets are purged, the finite state machine further operable to return to the first state from another state when one or more of the plurality of set-reset latch is set,
wherein the monitoring pulling one or more packets from an outbound queue includes:
recording a location pointed to by a write pointer in the outbound queue at a given time; and
monitoring to determine whether a read pointer in the outbound queue has passed the recorded location.

11. The system of claim 10, wherein a set-reset latch in the plurality of set-reset latches corresponds to a node for which one or more packets being purged are destined.

12. The system of claim 10, wherein each of the plurality of set-reset latches corresponds to a node for which one or more packets being purged are destined.

13. The system of claim 10, wherein the external signal is received with one or more specified attributes associated with one or more packets selected for purging.

14. The system of claim 13, wherein the specified attributes include at least port information or node information or combination thereof.

15. The system of claim 10, further including:
a second finite state machine operable to control purging of one or more packets associated with a port in a network.

16. The system of claim 10, wherein the finite state machine waits in the flushed state while the external purge signal remains active.

17. The system of claim 10, wherein the external purge signal is a pulse.

* * * * *